(12) United States Patent
Fernandez et al.

(10) Patent No.: US 6,759,800 B1
(45) Date of Patent: Jul. 6, 2004

(54) DIAMOND SUPPORTED PHOTOCATHODES FOR ELECTRON SOURCES

(75) Inventors: Andres Fernandez, Dublin, CA (US); Timothy Thomas, Portland, OR (US); Xiaolan Chen, Beaverton, OR (US); Steven T. Coyle, Newark, CA (US); Ming Yu, Fremont, CA (US); Marian Mankos, San Francisco, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 09/363,926

(22) Filed: Jul. 29, 1999

(51) Int. Cl.[7] .................... H01J 40/06; H01J 29/07

(52) U.S. Cl. .................... 313/373; 313/542; 313/523; 445/47; 445/24

(58) Field of Search .................... 313/523, 524, 313/542, 530, 541, 373, 384–86, 544, 539, 310–311, 346 R; 445/24, 47, 49, 50, 23

(56) References Cited

U.S. PATENT DOCUMENTS

| | | | |
|---|---|---|---|
| 3,757,151 A | 9/1973 | Ace | 313/39 |
| 3,972,770 A | 8/1976 | Stein | |
| 4,970,392 A | 11/1990 | Oettinger et al. | |
| 5,463,271 A * | 10/1995 | Geis et al. | 313/310 |
| 5,684,360 A | 11/1997 | Baum et al. | 313/542 |
| 6,376,985 B2 * | 4/2002 | Lee et al. | 313/542 |

FOREIGN PATENT DOCUMENTS

WO   WO 97/03453   1/1997

OTHER PUBLICATIONS

C.P. Beetz et al.: "Applications of diamond films to photo-cathode electron guns and accelerators" IEEE Particle Accelerator Conference, Accelerator Science & Technology (ISBN 0–7803–0135–8), May 6–9, 1991, pp. 1981–1983, XP002154667; San Francisco, US.*
C.P. Beetz et al., "Applications of Diamond Films to Photocathode Electron Guns and Accelerators", IEEE Particle Accelerator Conference, Accelerator Science & Technology (ISBN 0–7803–0135–8), May 6–9, 1991, pp. 1981–1983, XP002154667, San Francisco, US, the whole document.

* cited by examiner

Primary Examiner—Vip Patel
Assistant Examiner—Joseph Williams
(74) Attorney, Agent, or Firm—Jung-hua Kuo (57) ABSTRACT

A photocathode as a source of electron beams, having a substrate of optically transmissive diamond and a photoemitter. A photocathode with a single emitting region provides a single electron beam; a photocathode with multiple emitting regions provides multiple electron beams. The photoemitter is positioned on the side of the diamond substrate opposite the surface on which the illumination is incident, and has an irradiation region at the contact with the optically transmissive diamond, and an emission region opposite the irradiation region, these regions being defined by the path of the illumination. The diamond substrate at the irradiation region/emission region interface conducts heat away from this focused region of illumination on the photocathode. Alternately, a diamond film is used for heat conduction, while another material is used as a substrate to provide structural support. The thermal conductivity of diamond is at least three orders of magnitude greater than that of fused silica, which is an alternative substrate material for photocathodes. This allows for efficient conduction of heat away from the irradiation region/emission region interface, and therefore allows higher currents to be achieved from the photocathode. This, in turn, permits higher throughput rates in applications including electron beam lithography.

14 Claims, 6 Drawing Sheets

DIAMOND SUPPORTED PHOTOCATHODES FOR ELECTRON SOURCES

FIELD OF THE INVENTION

This invention relates to electron beam sources and, more particularly, to photocathodes for the generation of single or multiple electron beams.

BACKGROUND

Electron beam sources are used in several fields of endeavor, including scanning electron microscopes, defect detection instruments, VLSI testing equipment and electron beam (e-beam) lithography. In general, e-beam systems include an electron beam source and electron optics. The electrons are accelerated from the source and focused to define an image at a target. These systems typically use a physically small electron source having a high brightness.

Improvements in optical lithography techniques in recent years have enabled a considerable decrease in the linewidths of circuit elements in integrated circuits. Optical methods will soon reach their resolution limits. Production of integrated circuit elements with smaller line widths (i.e., those with line widths less than about 0.1 $\mu$m) will require new techniques such as X-ray or e-beam lithography, which can provide accompanying resolutions well below 1 micrometer because of the shorter wavelengths associated with X-rays or electrons.

Figure 1:
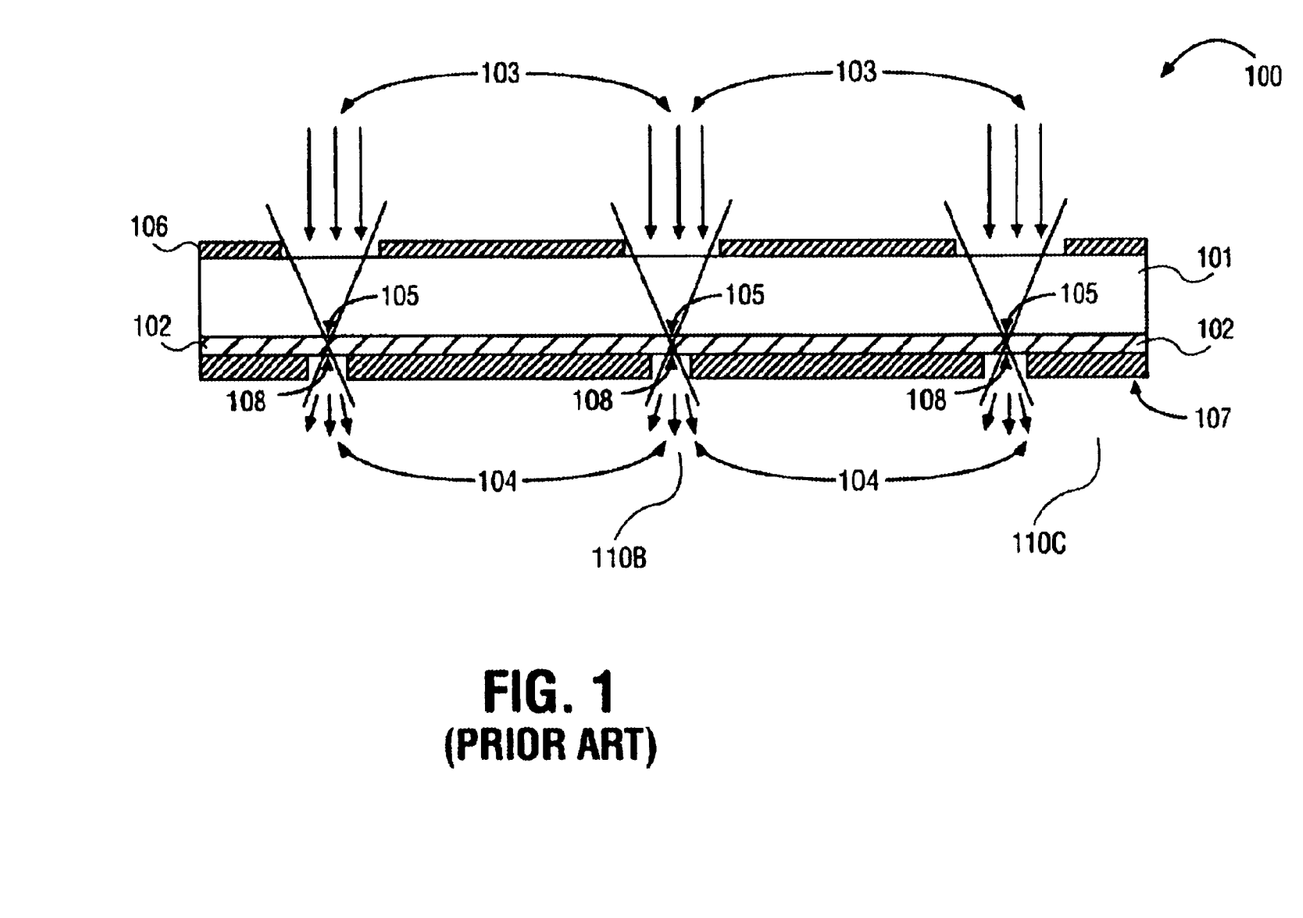
FIG. 1 shows a patterned photocathode according to the prior art.

In e-beam lithography, a controllable source of electrons is required. A photocathode used to produce an array of patterned e-beams is shown in FIG. 1. U.S. Pat. No. 5,684,360, Baum et al., "Electron Sources Utilizing Negative Electron Affinity Photocathodes with Ultra-Small Emission Areas," herein incorporated by reference in its entirety, describes a patterned photocathode system of this type.

Since modem lithographic systems must achieve fast writing times (high throughput rates) in addition to high resolution, their electron beams must also have a high brightness, which in the case of electron beams requires a high current density. This property is especially important for so-called direct write applications in which the electron beam is rapidly steered and modulated so as to effect a projection of the highly complex circuit directly onto a semiconducting chip substrate.

The primary motivation for using multiple beams in an electron-beam lithography system is to increase the total current that can be delivered while minimizing space-charge effects in each beam. In multiple e-beam lithography, multiple electron beams are created by focusing an array of light beams, where each light beam's intensity can be independently regulated, onto a photocathode in transmission mode (wherein the photocathode is back-illuminated with the light beams which are focused on a photoemission layer). The resulting electron beams from the photoemission layer are then accelerated, focused, and scanned across the wafer or mask using a conventional electron-optical column.

FIG. 1 shows in a side cross-sectional view a photocathode 100 having a transparent substrate 101 and a photoemission layer 102. The photocathode array 100 is back-illuminated by light beams 103 (having an envelope defined by the lines adjacent thereto) which are focused on photoemision layer 102 at irradiation region 105. As a result of the back-illumination onto photoemission layer 102, electron beams 104 are generated at an emission region 108 opposite each irradiation region 105. Other systems are known where the photoemitter is front-illuminated, i.e., the light beams are incident on the same side of the photoemitter from which the electron beam is emitted.

Photoemission layer 102 is made from any material that emits electrons when irradiated with light. These materials include metallic films (gold, aluminum, etc.) and, in the case of negative affinity (NEA) photocathodes, semiconductor materials (especially compounds of Group III and Group V elements such as gallium arsenide). Photoemission layers in negative electron affinity photocathodes are discussed in Baum (U.S. Pat. No. 5,684,360).

When irradiated with photons having energy greater than the work function of the material, photoemission layer 102 emits electrons. The resulting electron beam is shown below region 108 and has a lateral extent shown by the lines crossing at region 108. Photoemission layer 102 may also be shaped at emission region 108 in order to provide better irradiation control of the beam of electrons emitted from emission region 108.

Photons in light beam 103 have an energy of at least the work function of photoemission layer 102. The number of emitted electrons is directly proportional to the intensity of the light beam. Photoemission layer 102 is thin enough and the energy of the photons in light beam 103 is great enough that a significant number of electrons generated at irradiation region 103 migrate and are ultimately emitted from emission layer 108.

Transparent substrate 101 is transparent to the light beam and structurally sound enough to support the photocathode device within an electron beam column which may be a conventional column or a microcolumn. Transparent substrate 101 may also be shaped at its surface where light beams 103 are incident in order to provide focusing lenses for light beams 103. Typically, transparent substrate 101 is a glass although other substrate materials such as sapphire or fused silica are also used.

If mask 106 is present either on the surface of transparent substrate 101 or deposited between transparent substrate 101 and photoemission layer 102, it is opaque to light beam 103. If mask 107 is present, it absorbs electrons thereby preventing their release from emission region 108. Mask 107 may further provide an electrical ground for photoemission layer 102 provided that mask 107 is conducting.

Figure 2:
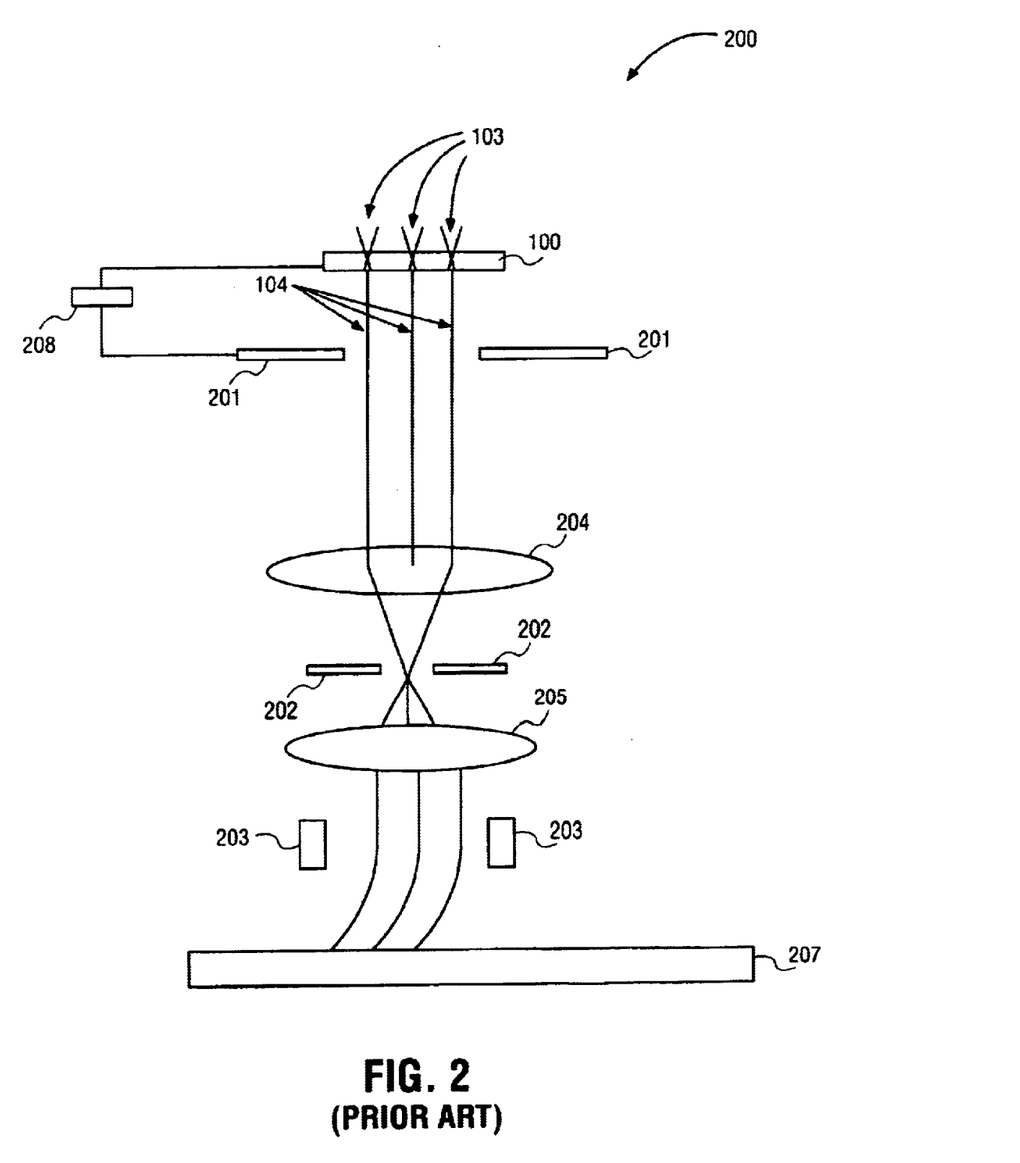
FIG. 2 depicts a conventional electron beam column using the photocathode shown in FIG. 1.

FIG. 2 shows in a side view a typical electron beam column 200 using photocathode array 100 as an electron source. Column 200 is enclosed within an evacuated column chamber (not shown). Photocathode 100 may be completely closed within the evacuated column chamber or transparent substrate 101 may form a window to the vacuum chamber through which light beams 103 gain access from outside the vacuum chamber. Electron beams 104 are emitted from emission region 108 into the evacuated column chamber and carry an image of emission region 108. Electron beam 104 may be further shaped by other components of column 200.

Electron beams 104 are accelerated between photocathode array 100 and anode 201 by a voltage supplied between anode 201 and photoemission layer 102. The voltage between photocathode array 100 and anode 201, created by power supply 208 (housed outside of the vacuum chamber), is typically a few kilovolts to a few tens of kilovolts. The electron beam then passes through electron lens 204 that focuses the electron beam onto limiting aperture 202. Limiting aperture 202 blocks those components of the electron beams that have a larger emission solid angle than desired. Electron lens 205 refocuses the electron beam. Electron lenses 204 and 205 focus and demagnify the image carried by the electron beam onto target 207. Deflectors 203 cause the electron beam to laterally shift, allowing control over the location of the image carried by the electron beam on a target 207.

One of the critical challenges in developing a photocathode as the electron beam source in multiple electron beam lithography featuring high current is the ability to conduct heat away from the focused regions of illumination on the photocathode. The laser power needed to produce a certain beam current depends on the conversion efficiency of the photocathode material. A considerable amount of energy per unit area is dissipated in these regions due to the relatively low conversion efficiency of the photoemission process. For example, if a gold film approximately 15 nm in thickness is used as the photoemission layer 102, the efficiency is about $5 \times 10^{-5}$, which implies that 5 mW of laser beam power is needed to produce a 100 nA beam.

When this amount of power is focused into a small spot (approximately 1 $\mu$m diameter) on a thin film, the heat flow is limited by conduction through the cathode support material. This conduction path is inefficient due to the generally low thermal conductivity of optically transparent substrate materials such as fused silica (glass). Consequently, a significant temperature rise will occur at the photocathode. For a fused silica substrate and a 1 $\mu$m spot size, a 15 nm gold film (used as the photoemitter) will be heated on the order of 1000° C. Without adequate cooling, the resulting temperature rise could degrade or even destroy the photocathode. This may impose a severe limit on the total current that can be generated in each beam and thus may limit the overall throughput of the lithography system. Clearly, there is a need for adequate cooling for the photocathode.

While others have contemplated the use of thermoelectric devices for use in cooling photocathodes (wherein the thermoelectric device is directly secured to the photocathode, or a layer of electrically insulating but thermally conductive material is interposed between the thermoelectric device and the photocathode-see Ace, U.S. Pat. No. 3,757,151), the physical size of these devices prevent their use in e-beam lithography.

SUMMARY

According to the present invention, a photoemissive cathode is operable to emit multiple high current density beams of electrons upon illumination with appropriate light. The photocathode device includes a photoemitter and optically transmissive diamond providing heat conduction and acting as a substrate for the photoemitter in one embodiment, or providing heat conduction only in another embodiment.

The photoemitter is positioned on the side of the diamond substrate opposite the side receiving illumination, and has an irradiation region at the contact area with the optically transmissive diamond substrate, and an emission region opposite the irradiation region, these regions being defined by the axis of the light beams. The diamond substrate at the irradiation region/emission region interface conducts heat away from this focused region of illumination on the photocathode. The thermal conductivity of diamond is at least three orders of magnitude greater than that of fused silica, which is the substrate material conventionally used in photocathodes. Accordingly, a proportionally lower temperature rise at the irradiation region/emission region interface is expected for a given incident power and laser spot size. Several embodiments of the invention are described, including an embodiment where diamond is used, and an embodiment where a diamond film is used for heat conduction. All embodiments allow for efficient conduction of heat away from the irradiation region/emission region interface, and therefore allow higher currents to be achieved from the photocathode. This, in turn, permits higher throughput rates in applications including electron beam lithography. While the invention may be employed in many applications where a source of electrons is required, it is particularly suitable for use in e-beam lithography.

The invention and its various embodiments are further discussed along with the following figures and the accompanying text.

DETAILED DESCRIPTION

Figure 3A:
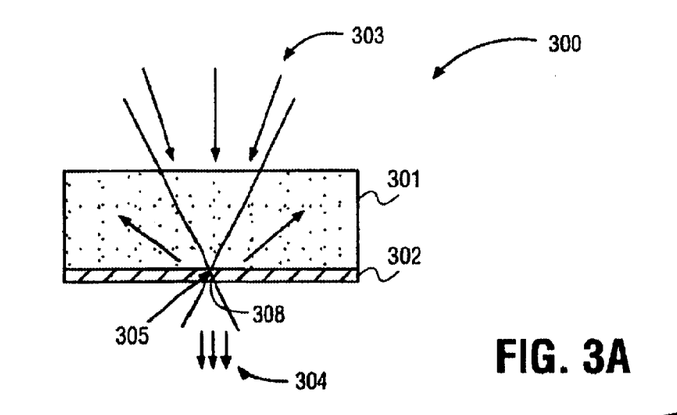
FIG. 3A shows a photocathode according to an embodiment of the present invention which utilizes a diamond substrate both to conduct heat away from the photoemitter film and to act as a substrate for the photoemitter.

FIG. 3A shows in a side cross-sectional view an embodiment of a photocathode 300 according to the present invention (the conventional associated supports, vacuum housing, electrical leads, etc. are not shown). In FIG. 3A, a photoemitter 302 is deposited on an optically transmissive diamond substrate 301. A light beam 303 is incident on substrate 301, and is absorbed by photoemitter 302 at irradiation region 305. Photoemitter 302 emits electrons 304 from emission area 308, located on the surface of photoemitter 302 opposite of irradiation region 305, when light beam 303 is incident upon irradiation region 305. A laser conventionally may be the source of the light beams. For example, a frequency doubled Argon laser and a lasing wavelength of 257 nm may be used. The irradiation region 305 and the emission region 308 meet at an interface; heat is generated by the absorption of light in the photoemitter.

Diamond substrate 301 is transmissive to light beam 303 so that the maximum amount of light possible is incident on irradiation region 305. The thickness of the diamond substrate 301 in photocathode 300 ranges from 0.1 micrometers to 1 millimeter, or thicker. The transparent diamond substrate is preferably of sufficient thickness to allow adequate lateral heat flow away from the irradiation region 305.

Diamond has a thermal conductivity which is nearly 1500 times greater than that of fused silica, which is an alternative substrate material for e-beam lithography photocathodes. Since the amount of heat conducted away from the irradiation region 305 is proportional to the thermal conductivity of the substrate material, a proportionally lower temperature rise at the photocathode can be expected for a given incident power and laser spot size. For example, using 10 mW of laser power and a 250 nm laser spot size on a photocathode having a 15 nm thick photoemitter of gold mounted on a fused silica substrate, the temperature rise is estimated to be 6040° C. By contrast, if diamond is used as the substrate in the photocathode, the temperature rise will only be 4° C.

Photoemitter 302 is of any material that emits electrons when illuminated. Examples of photoemitting materials include gold, and carbide materials. In addition, many compounds of Group III and Group V elements, such as GaAs, are suitable photoemitter materials.

Photoemitter 302 will have a work function determined by the actual photoemitter material. The work function is the minimum energy required to release an electron from the material. The photons in light beam 303 must have an energy at least as great as the work function in order that photoemitter 302 will emit electrons.

Light beam 303 is absorbed by photoemitter 302 throughout the irradiation region 305 from the substrate to the vacuum surface. At that point, the emitted electrons have a kinetic energy equal to the photon energy minus the work function. These electrons migrate from irradiation region 305 to emission region 308 and are emitted from the material at emission region 308 provided that the electrons have not lost too much energy to collisions. As such, the thickness of photoemitter 302 should be sufficient to absorb light beam 303 but not so thick as to reabsorb a significant number of the free electrons created. Preferably, photoemitter 302 is made from gold and has a thickness of about 15 nanometers. However, other thicknesses are possible. The invention is not limited to any particular photoemitting materials.

Figure 3B:
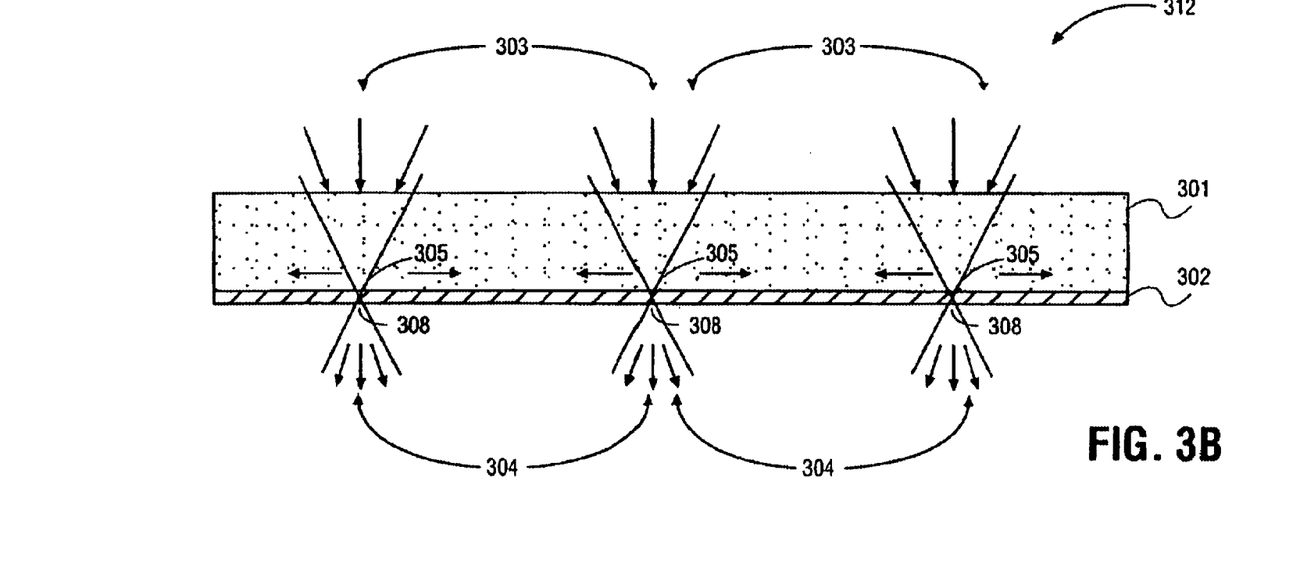
FIG. 3B shows a photocathode with three emitting regions according to the embodiment shown in FIG. 3A.

FIG. 3B shows in a side cross-sectional view a photocathode 312 with three emitting regions 308. When illuminated, each region generates electron beams.

Figure 4A:
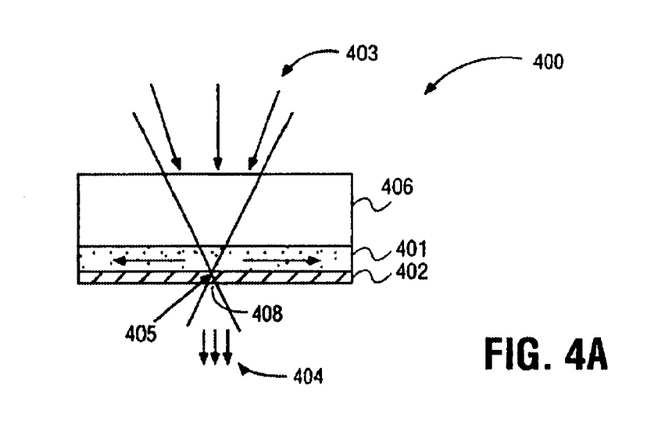
FIG. 4A shows a photocathode according to an embodiment of the present invention which utilizes a single crystal or polycrystalline diamond film for heat conduction only.

FIG. 4A depicts in a side cross-sectional view another embodiment of the photocathode 400. A photoemitter 402 is deposited on a single crystal or polycrystalline optically transmissive diamond film 401. A light beam 403 is incident on the single crystal or polycrystalline optically transmissive diamond film 401, and is absorbed by photoemitter 402 at irradiation region 405. Photoemitter 402 emits electrons 404 from emission area 408, located on the surface of photoemitter 402 opposite of irradiation region 405, when light beam 403 is incident upon irradiation region 405. The irradiation region 405 and the emission region 408 meet at an interface where heat is generated by the light beams absorbed by photoemitter 402. A laser is a suitable source of the light beams.

The single crystal or polycrystalline diamond film 401 is used for heat conduction, while a possibly different optically transmissive material 406 provides support for photoemitter 402 and diamond film 401. In this embodiment, the single crystal or polycrystalline diamond film 401 is in contact with optically transmissive substrate material 406 along its entire area. The optically transmissive substrate material selected has a damage threshold high enough to withstand the strength of the incident laser beam.

The same considerations described above for FIG. 3 with regard to selection of photoemitters apply to this embodiment of the invention.

Figure 4B:
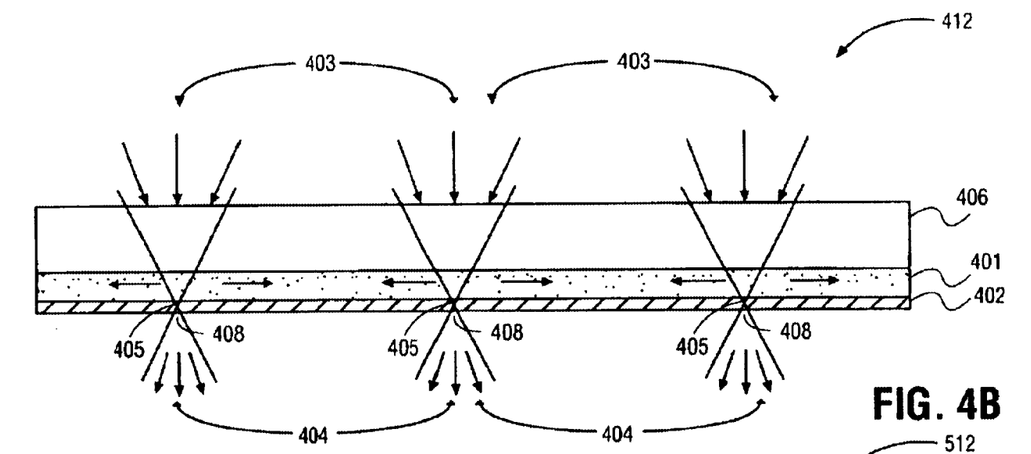
FIG. 4B shows a photocathode with three emitting regions according to the embodiment shown in FIG. 4A.

FIG. 4B shows in a side cross-sectional view a photocathode 412 with three emitting regions 408. When illuminated, each region generates electron beams.

Figure 5A:
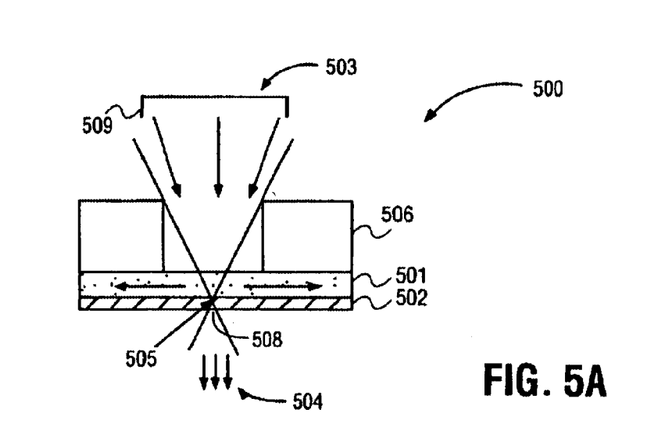
FIG. 5A depicts an embodiment similar to that depicted in FIG. 4A, except that the photoemitter support material is not in contact with the diamond film along the entire area of the film.

FIG. 5A depicts in a side cross-sectional view another embodiment very similar to that of FIG. 4A. However, here, the diamond film 501 is not in contact with substrate material 506 along its entire area. Instead, the single crystal or polycrystalline diamond film 501 is free standing at various points along its area due to the notch 509 formed in the substrate 506. In this embodiment, the substrate material 506 need not be optically transmissive, so long as the points along the diamond film which are free standing are the intended target areas for the laser beam. The diamond film 501 can be bonded to substrate 506 in any of a number of ways (epoxy, for example). The notched region 509 can be made for example, by ultrasonic drilling.

Figure 5B:
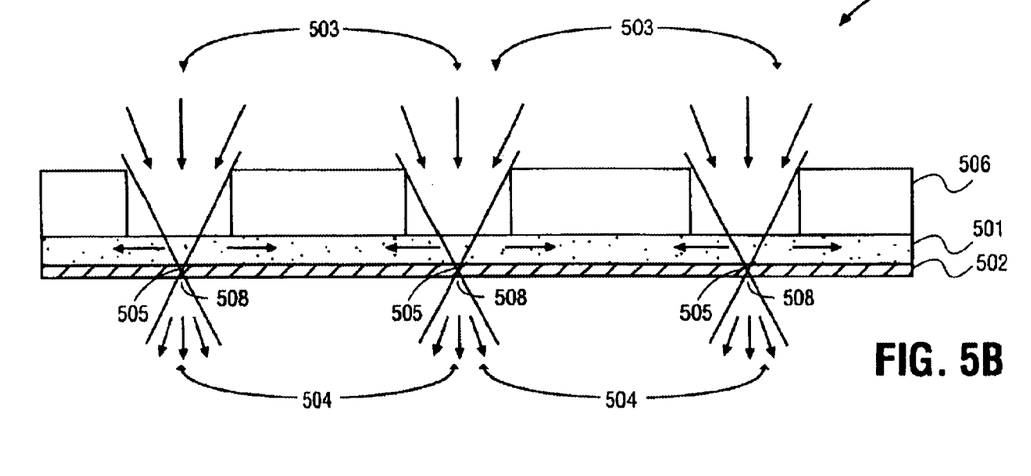
FIG. 5B shows a photocathode with three emitting regions according to the embodiment shown in FIG. 5A.

FIG. 5B shows in a side cross-sectional view a photocathode 512 with three emitting regions 508. When illuminated, each region generates electron beams.

The thickness of the single crystal or polycrystalline diamond film is in the range of 0.1 $\mu$m to 1 mm, or thicker. In any event, the thickness of the diamond film is sufficient to provide adequate heat flow away from the irradiation region/emission region interface. The thermal conductivity of synthetic single crystal diamond film and polycrystalline diamond film is approximately equal to that of natural diamond.

A photocathode device as in FIGS. 4A or 5A having a single crystal diamond film may be fabricated according to the following steps. Natural diamond is cut and polished or synthetic diamond is made, and then bonded to a substrate, the substrate either not having (FIG. 4A) or having (FIG. 5A) a notch. The notch may be formed, for example, by ultrasonic drilling. If a notch is present, the diamond is bonded to the side of the substrate opposite the notch. A photoemitter layer is then grown by standard crystal growing techniques or directionally deposited onto the diamond film using, for example, thermal evaporation or ionized sputtering. The substrate is, for example, glass, fused silica, or sapphire.

A photocathode device as in FIGS. 4A or 5A having a polycrystalline diamond film may be fabricated according to the following steps. The polycrystalline diamond film is deposited directly onto the substrate material using, for example, chemical vapor deposition, the substrate either not having (FIG. 4A) or having (FIG. 5A) a notch. If a notch is present, the diamond is formed on the side of the substrate opposite the notch. A photoemitter layer is then grown by standard crystal growing techniques or directionally deposited onto the diamond film using, for example, thermal evaporation or ionized sputtering. Alternatively, the polycrystalline diamond film is deposited directly onto a sacrificial substrate using, for example, chemical vapor deposition. The sacrificial substrate is then removed. Then, the free-standing polycrystalline diamond film is bonded to the substrate, the substrate either not having (FIG. 4A) or having (FIG. 5A) a notch. If a notch is present, the diamond is formed on the side of the substrate opposite the notch. A photoemitter layer is then grown using standard crystal growing techniques or directionally deposited onto the diamond film using, for example, thermal evaporation or ionized sputtering.

In at least one embodiment, the photocathode device is held in place in the electron beam column by clamping it in between two vacuum gaskets. In at least one embodiment, the diamond in the same diameter as the substrate. As long as the diameter of the diamond is on the order of 1 mm, there will be sufficient heat transfer to cool the photocathode. In one embodiment, the diamond is 30 mm in diameter and 6 mm in thickness.

FIGS. 3A, 3B, 4A, 4B, 5A, and 5B are useful to illustrate another aspect in accordance with the invention. That is, a diamond supported photocathode offers considerable advantages over conventional sources for single-beam applications. For a given spot size at the irradiation region/emission region interface, the brightness can be varied by modulating the laser power from approximately $10^5$ A/cm$^2$-sr to approximately $10^8$ A/cm$^2$-sr at 50 keV. Currently, LaB$_6$ (Lanthanum Hexaboride) sources have a brightness of up to $10^6$ A/cm$^2$-sr, and Schottky emitters have a brightness of greater than $10^8$ A/cm$^2$-sr. The diamond supported photocathode source provides a solution for this gap in the brightness range. This may be very useful for lithography applications where brightness matching is required. Furthermore, it would be beneficial to have such high total currents with lower brightness than a Schottky source as this will reduce space-charge blurring within the beam. This will result in better patterning resolution. Finally, the stability and noise characteristics of a photocathode may be comparable to, if not better, than, TFE sources.

Figure 6:
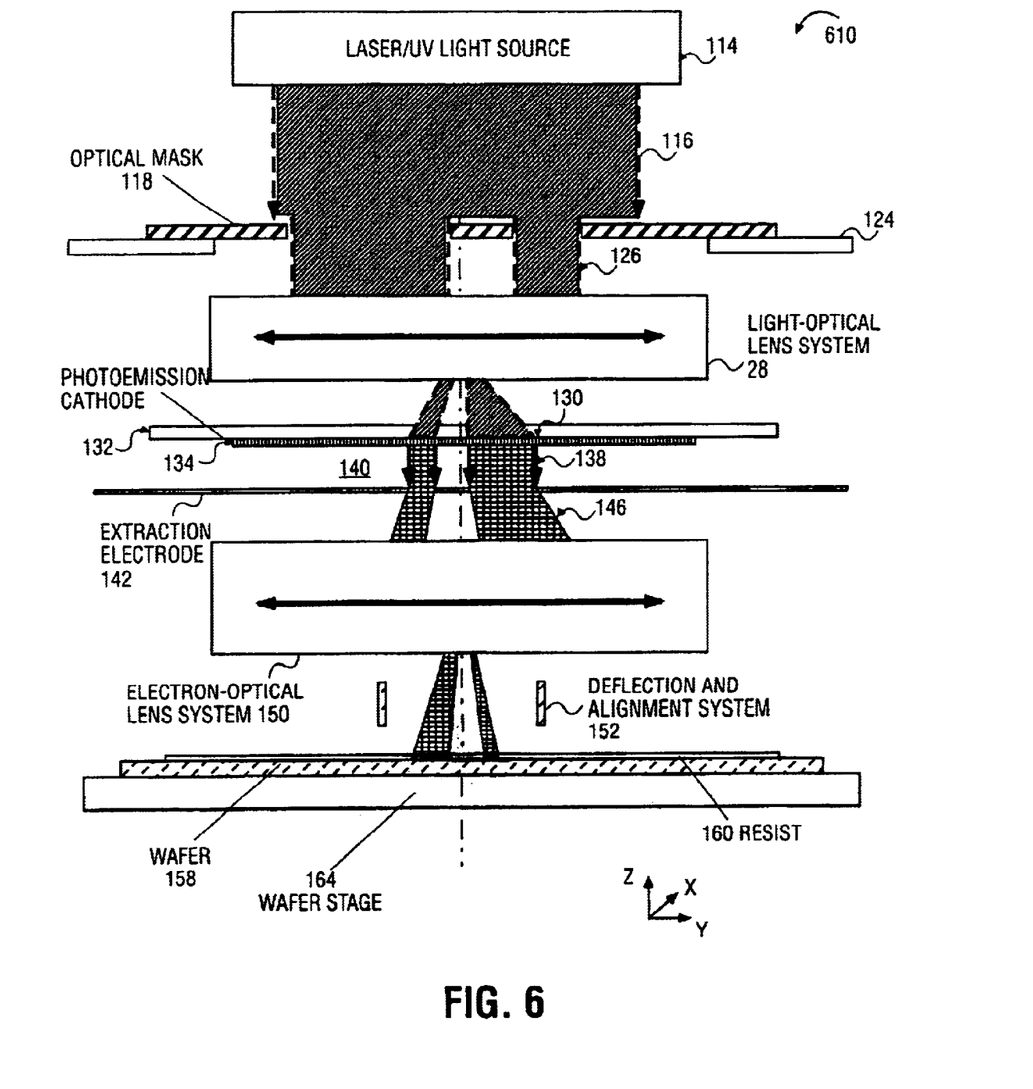
FIG. 6 shows an electron beam lithography system using a photocathode according to an embodiment of the present invention.

FIG. 6 depicts in a side view one type of so-called "hybrid" multiple e-beam lithography, in which multiple electron beams are created by focusing an array of light beams, where each light beam's intensity can be independently regulated, onto a photocathode of the present invention in transmission mode (wherein the photocathode is back-illuminated with the light beams which are focused on a photoemission layer). This Figure is discussed in greater detail in a co-pending related application, "Patterned Heat Conducting Photocathode for Electron Beam Sources", inventors Andres Fernandez, Marian M. Mankos, Tai-Hon Philip Chang, Kim Lee, Steven T. Coyle, Ser. No. 09/052,903 the disclosure of which is herein incorporated by reference.

This disclosure is illustrative and not limiting; further modifications will be apparent to one skilled in the art and are intended to fall within the scope of the appended claims.

We claim:

1. A photocathode device comprising:
   a diamond layer optically transmissive to at least some illumination, said layer having a back surface to receive said illumination and an opposing front surface, wherein said diamond layer is a film of single crystal diamond;
   a photoemitter on said front surface of said diamond layer, said photoemitter having an irradiation region adjacent said diamond layer and an emission region opposite said irradiation region, said photoemitter emitting a beam of electrons upon exposure to said illumination;
   a substrate optically transmissive to said illumination, said substrate having a back surface to receive said illumination and an opposing front surface disposed adjacent to said diamond layer; and
   a notch defined in said substrate adjacent with said irradiation region, wherein said diamond film is exposed to said illumination directly, without said illumination first passing through said substrate.

2. A photocathode device comprising:
   a diamond layer optically transmissive to at least some illumination, said layer having a back surface to receive said illumination and an opposing front surface;
   a photoemitter on said front surface of said diamond layer, said photoemitter having an irradiation region adjacent said diamond layer and an emission region opposite said irradiation region, said photoemitter emitting a beam of electrons therefrom at its emission region upon exposure to said illumination, wherein said photoemitter is gold; and
   a substrate optically transmissive to said illumination, said substrate having a back surface to receive said illumination and an opposing front surface disposed adjacent to said diamond layer.

3. A method of fabricating a photocathode, comprising the steps of:
   providing an optically transmissive diamond layer;
   forming a photoemitter layer on a surface of said diamond layer, wherein forming a photoemitter layer includes depositing photoemissive material using thermal evaporation or ionized sputtering; and
   providing an optically transmissive substrate opposite said surface of said diamond layer.

4. A method of fabricating a photocathode, comprising the steps of:
   providing an optically transmissive substrate;
   forming an optically transmissive diamond film on a surface of said substrate; and
   forming a photoemitter layer on said diamond film, wherein forming a photoemitter layer includes directionally depositing photoemissive material using thermal evaporation or ionized sputtering.

5. A method of fabricating a photocathode, comprising the acts of:
   providing a substrate;
   drilling a principal surface of said substrate to define a notch in said substrate;
   providing a single crystal diamond;
   bonding said single crystal diamond to a surface opposite said principal surface of said substrate; and
   forming a photoemitter layer onto said single crystal diamond.

6. The method of claim 5, wherein forming a photoemitter layer includes directionally depositing photoemissive material using thermal evaporation or ionized sputtering.

7. The method of claim 5, wherein forming a photoemitter layer includes growing the photoemitter layer onto the diamond.

8. A method of fabricating a photocathode, comprising the acts of:
   providing a substrate;
   drilling a principal surface of said substrate to define a notch in said substrate;
   depositing a polycrystalline diamond film on a surface opposite said principal surface of said substrate by chemical vapor deposition; and
   forming a photoemitter layer onto said single crystal diamond.

9. The method of claim 8, wherein forming a photoemitter layer includes directionally depositing photoemissive material using thermal evaporation or ionized sputtering.

10. The method of claim 8, wherein forming a photoemitter layer includes growing the photoemitter layer onto the diamond.

11. A method of fabricating a photocathode, comprising the acts of:
   providing a sacrificial substrate;
   depositing a polycrystalline diamond film directly on said sacrificial substrate;

removing said sacrificial substrate;

providing a substrate;

drilling a principal surface of said substrate to define a notch in said substrate;

bonding said polycrystalline diamond film to a surface opposite said principal surface of said substrate; and forming a photoemitter layer onto said single crystal diamond.

12. The method of claim 11, wherein forming a photoemitter layer includes directionally depositing photoemissive material using thermal evaporation or ionized sputtering.

13. The method of claim 11, wherein forming a photoemitter layer includes growing the photoemitter layer onto said polycrystalline diamond film.

14. An electron beam generator comprising:

a source of illumination;

a support for holding a partially opaque mask to be illuminated by said source of illumination;

an optical lens located to focus the illumination that passes through said mask;

a photocathode device located to receive the focused illumination and convert the illumination into an electron stream, said photocathode device comprising:

a diamond layer optically transmissive to at least some illumination, said layer having a back surface to receive said illumination and an opposing front surface;

a photoemitter on said front surface of said diamond layer, said photoemitter having an irradiation region adjacent said diamond layer and an emission region opposite said irradiation region, said photoemitter emitting a beam of electrons upon exposer to said illumination; and a photocathode substrate optically transmissive to said illumination, said photocathode substrate having a back surface to receive said illumination and an opposing front surface disposed adjacent to said diamond layer, wherein said photocathode substrate defines a notch adjacent to said irradiation region, wherein the illumination exposes said diamond layer directly without first passing through said photocathode substrate;

an electron lens located to focus the electron beam into a beam; and a support for a substrate for exposure, the support for the substrate for exposure being located so that the electron beam is incident on a surface of the substrate.

* * * * *